(12) United States Patent
Ying et al.

(10) Patent No.: US 10,400,106 B2
(45) Date of Patent: Sep. 3, 2019

(54) LIGNIN ENHANCED WOOD-PLASTIC MATERIAL AND PREPARATION METHOD THEREOF

(71) Applicant: NANJING TECH UNIVERSITY, Nanjing (CN)

(72) Inventors: Hanjie Ying, Nanjing (CN); Lingxia Zhong, Nanjing (CN); Chenjie Zhu, Nanjing (CN); Chenglun Tang, Nanjing (CN); Xiao Zhang, Nanjing (CN); Yong Chen, Nanjing (CN); Jinglan Wu, Nanjing (CN); Tao Gan, Nanjing (CN); Jungiang Shan, Nanjing (CN); Dong Liu, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 15/801,210

(22) Filed: Nov. 1, 2017

(65) Prior Publication Data
US 2018/0072889 A1 Mar. 15, 2018

(30) Foreign Application Priority Data
Aug. 3, 2017 (CN) .......................... 2017 1 0659376

(51) Int. Cl.
| | | |
|---|---|---|
| C08L 97/02 | (2006.01) | |
| C08L 23/06 | (2006.01) | |
| C08L 23/12 | (2006.01) | |
| C08L 25/06 | (2006.01) | |
| C08L 27/06 | (2006.01) | |
| C08L 55/02 | (2006.01) | |
| C08L 69/00 | (2006.01) | |
| C08L 97/00 | (2006.01) | |
| B29C 48/00 | (2019.01) | |
| B29C 48/92 | (2019.01) | |
| B29C 48/16 | (2019.01) | |
| B29C 48/40 | (2019.01) | |
| B29C 48/38 | (2019.01) | |
| B29K 1/00 | (2006.01) | |
| B29K 101/12 | (2006.01) | |

(52) U.S. Cl.
CPC ............ *C08L 97/02* (2013.01); *B29C 48/022* (2019.02); *B29C 48/023* (2019.02); *B29C 48/16* (2019.02); *B29C 48/38* (2019.02); *B29C 48/40* (2019.02); *B29C 48/92* (2019.02); *C08L 23/06* (2013.01); *C08L 23/12* (2013.01); *C08L 25/06* (2013.01); *C08L 27/06* (2013.01); *C08L 55/02* (2013.01); *C08L 69/00* (2013.01); *C08L 97/005* (2013.01); B29C 2948/9259 (2019.02); B29C 2948/92704 (2019.02); B29K 2001/00 (2013.01); B29K 2101/12 (2013.01); C08L 2205/08 (2013.01); *C08L 2666/34* (2013.01); *C08L 2666/54* (2013.01); *C08L 2666/72* (2013.01)

(58) Field of Classification Search
CPC ........ C08L 97/02; C08L 97/005; C08L 23/12; B29C 47/0004; B29C 48/022
See application file for complete search history.

(56) References Cited

U.S. PATENT DOCUMENTS

| | | | | |
|---|---|---|---|---|
| 4,818,604 A | * | 4/1989 | Tock ...................... | B27N 3/005 428/319.9 |
| 5,973,035 A | * | 10/1999 | Medoff .................. | A01N 25/34 523/129 |
| 2004/0220299 A1 | * | 11/2004 | Drabeck, Jr. ........... | C08L 97/02 524/27 |
| 2008/0214699 A1 | * | 9/2008 | Halahmi ................. | B29B 7/005 523/222 |
| 2010/0305241 A1 | * | 12/2010 | Balakshin .............. | A61K 36/15 524/74 |
| 2013/0210964 A1 | * | 8/2013 | Cernohous .............. | C08L 23/12 524/14 |

FOREIGN PATENT DOCUMENTS

| | | | | |
|---|---|---|---|---|
| CN | 102417738 A | * | 4/2012 | ......... B29C 47/0011 |
| CN | 106189325 A | | 12/2016 | |
| JP | 2001002929 A | * | 1/2001 | |

OTHER PUBLICATIONS

English-language machine translation of JP2001002929, conducted on Espacenet website on Dec. 18, 2018.*
A. Gregorova, et al., "Stabilization Effect of Lignin in Polypropylene and Recycled Polypropylene," 89 Polymer Degradation & Stability 553, 553-58 (2005).*
A. Gregorova, et al., "Radical Scavenging Capacity of Lignin and Its Effect on Processing Stabilization of Virgin and Recycled Polypropylene," 106 J. App. Polymer Science 1626, 1626-31 (2007).*
English-language machine translation of CN102417738, conducted on Espacenet website on Dec. 18, 2018.*
English-language machine translation of CN106189325, conducted on Proquest website on Dec. 19, 2018.*
Bibliographic data from CN106189325, downloaded from Espacenet on Mar. 28, 2019.*

* cited by examiner

*Primary Examiner* — Nicholas E Hill
(74) *Attorney, Agent, or Firm* — CBM Patent Consulting, LLC

(57) ABSTRACT

It discloses a lignin enhanced wood-plastic composite, belonging to the field of polymer based composites. The wood-plastic composite is composed of one or more of plant fiber, lignin, a recycled thermoplastic plastic, mineral powder and a processing aid, and is processed by a screw granulating extrusion process. Compared with the prior art, the mechanical properties, heat stability and aging resistance of a wood-plastic material are improved by adding lignin into the wood-plastic material according to the present invention.

8 Claims, No Drawings

LIGNIN ENHANCED WOOD-PLASTIC MATERIAL AND PREPARATION METHOD THEREOF

This application claims priority to Chinese Patent Application Ser. No. CN201710659376.7 filed 3 Aug. 2017.

TECHNICAL FIELD

The present invention belongs to the field of wood-plastic materials, and specifically relates to a lignin enhanced wood-plastic material and a preparation method thereof.

BACKGROUND ART

Lignin is a kind of substance composed of polymerized aromatic alcohols, which exists in woody tissues. The main function of the lignin is to harden cell walls by forming interlaced nets, so as to form a main component of secondary walls. A benzene ring, an aldehyde group, a ketone group, a carboxyl group, a double bond etc. in a basic functional group contained in the lignin each have a certain ultraviolet absorption effect, so that the lignin can be applied to a wood-plastic composite to improve the ultraviolet aging resistance effect of the wood-plastic composite; moreover, the lignin contains a photosensitive group, for example a carbonyl group, is instable to light, and can achieve controllability of a degradation period of the wood-plastic composite through reasonable proportioning; in addition, the lignin is mainly positioned among cellulose fibers to achieve a compression resisting effect, so that the lignin can improve the performance of the wood-plastic material when it is added into the wood-plastic material.

Generally, photostabilizers, such as a light shielding agent, a radical scavenger, an ultraviolet absorbent, etc., UV-P (2-(2'-hydroxy-5'-methylphenyl)benzotriazole), UV-0 (2,4-dihydroxy benzophenone), UV-9 (2-hydroxy-4-methoxybenzophenone), UV-531 (2-hydroxy-4-n-octyloxybenzophenone), etc. are directly added into raw materials of the existing wood-plastic composite in order to improve the uvioresistant effect of the existing wood-plastic composite, and these photostabilizers are high in price. Compared with these photostabilizers, the lignin widely exists in nature, and a large amount of wastes are generated every year. Therefore, these wastes are combined with plant cellulose, the uvioresistant effect of the wood-plastic composite can be improved by using ultraviolet absorption groups therein, and the cost can be reduced while the environment is protected. In addition, the lignin contains a large amount of alcoholic hydroxyl groups and phenolic hydroxyl groups, and can improve the compatibility of the composite material, thereby improving the mechanical properties of the composite material.

At present, plant wood fiber, as a main component for producing wood-plastic composites, has been widely studied and applied in various kinds of dosages. An application number CN201310324655.X applies different types of plant fibers to production of wood-plastic materials. Application numbers CN204398445U and CN105315688A, in order to solve the problems of the application of agricultural straws, the shortage of wood flour, etc., focus on the research of lignin products based on agricultural straws and other plant fibers, and achieve a good effect. However, application of lignin as a second largest renewable resource to wood-plastic materials is rarely researched. In CN102051002A, enzymatic hydrolysis lignin is used to mix with wood fiber and polyolefin, so as to prepare a wood-plastic composite, but only the enzymatic hydrolysis lignin is used, and other lignins are not effectively utilized; in addition, all substances are mixed in a high-speed mixer, a lubricant, a coloring agent and the like therein are not good for modification grafting of a compatilizer on straw powder and lignin, so that the raw materials (the plastic, the straw powder, the lignin, the inorganic mineral powder, etc.) cannot be fully compatible and mixed together. Therefore, according to the present invention, experiments are carried out on the application of different lignins, and a two-stage in-situ modified granulation extrusion method is adopted, namely the raw materials are subjected to compatible blending in a first step, so that the raw materials are fully mixed, then other processing aids are added during extrusion granulation, and after granulation, the wood-plastic composite which has good mechanical properties, aging resistance and ultraviolet aging resistance can be prepared by extrusion.

SUMMARY OF THE INVENTION

The present invention provides a lignin enhanced wood-plastic material to solve the problem of poor aging resistance of a wood-plastic material in the prior art.

The present invention also aims to solve the technical problem and provide a preparation method of the lignin enhanced wood-plastic material.

In order to solve the above technical problem, the present invention adopts a technical scheme as follows:

The lignin enhanced wood-plastic material has a formula including the following components in parts by weight:
  20-60 parts of lignocellulose,
  20-40 parts of lignin,
  20-40 parts of recycled thermoplastic plastic,
  2-10 parts of a compatilizer,
  5-10 parts of inorganic mineral powder,
  1-5 parts of a coloring agent and
  1-5 parts of a lubricant,
wherein the lignocellulose is plant fiber, the plant fiber may be any one of or a combination of more of wood flour, bamboo powder, straw powder, cotton stalks, wood processing leftovers, xylose residues and furfural residues, preferably one of or a combination of two of the xylose residues and the furfural residues.

The xylose residues are residues remained after acid pretreatment on corncobs, bagasse, bamboo chips, etc. and extraction on xylose. Compared with other plant lignocellulose, the contents of crystalline cellulose and lignin in the xylose residues are relatively high. A result of an experiment using the xylose residues as a raw material shows that compared with bamboo powder and rice hull, the xylose residues can obviously improve physical properties and mechanical properties (such as impact strength, tensile property, etc.) of the wood-plastic material, and can also obviously improve the ultraviolet aging resistance effect at the same time.

The lignin is any one of or a combination of more of papermaking lignin, enzymatic hydrolysis lignin, alkali lignin, organic solvent lignin and lignosulfonate.

The enzymatic hydrolysis lignin is industrial enzymatic hydrolysis lignin, which is obtained by extracting cellulosic ethanol residues with an organic solvent.

The alkali lignin is obtained through dissolution with 2%-3% of sodium hydroxide and then acid precipitation.

The organic solvent lignin refers to a lignin obtained by extraction through dimethyl sulfoxide and dioxane.

The lignosulfonate refers to calcium lignosulfonate.

The papermaking lignin is lignin obtained by performing evaporating concentration on papermaking black liquid and then performing acid precipitation.

The recycled thermoplastic plastic is any one of or a combination of more of recycled PP (polypropylene), PE (polyethylene), PVC (polyvinyl chloride), PS (polystyrene), acrylonitrile-butadiene-styrene copolymer and polyamide.

The recycling of the recycled plastics is achieved after mechanical blade crushing operation. Because plastics are prepared from a petroleum refined product, petroleum resources are limited, and at the same time, the plastics cannot be degraded naturally, so that the plastics have become the first enemy of human beings, and have brought serious environmental problems. Therefore, the present patent uses the recycled plastics to achieve dual advantages of resource recycling and environmental protection.

The compatilizer is one of or a mixture of more of maleic anhydride, acrylic acid, maleic anhydride grafted PP, maleic anhydride grafted PE, maleic anhydride grafted PVC, maleic anhydride grafted PS, acrylic acid grafted PP, acrylic acid grafted PE, acrylic acid grafted PVC and acrylic acid grafted PS, and the compatilizer may also be any one of or a combination of more of a silane coupling agent, a titanate coupling agent, and isocyanate.

As a preference, the silane coupling agent is N-((3-aminoethyl)-γ-aminopropyl trimethoxy(triethoxy) silane KH-792, γ-methacryloxy propyl trimethoxy silane KH-570, γ-(glycidoxypropyl) triethoxy silane KH-560 or γ-aminopropyl triethoxy silane KH-550.

As a preference, the titanate coupling agent is isopropyl tri(dioctylpyrophosphate)titanate, isopropyl tri(dioctylphosphate)titanate, isopropyl dioleate(dioctylphosphate)titanate, monoalkoxy unsaturated fatty acid titanate, plant acid type monoalkoxy titanate, pyrophosphate type monoalkoxy titanate, phosphate type monoalkoxy titanate, compound type monoalkoxy titanate and a tetrabutyl titanate coupling agent.

The inorganic mineral powder is one of or a mixture of more of calcium carbonate, calcium silicate, talcum powder, glass fiber powder, barium sulfate, calcium sulfate, lithopone, carbon black, metal oxide, metal powder and fiber mineral powder.

The calcium carbonate is ground calcium carbonate, light calcium carbonate or activated calcium carbonate.

The metal oxide is aluminum oxide, iron oxide, zinc oxide, manganese oxide, magnesium oxide and iron oxide.

The metal powder is aluminum, bronze, zinc, copper and lead.

The fiber mineral powder is carbon fiber, boron fiber and asbestos fiber.

The lubricant is one of or a mixture of more of stearic acid, calcium stearate, zinc stearate, polyol ester, oleamide, microcrystalline wax, EBS, liquid paraffin, and polyethylene wax; and the polyol ester is glyceride, pentaerythritol ester and sucrose ester.

The coloring agent is one of or a mixture of more of iron oxide red, iron oxide yellow, iron oxide blue, iron oxide purple and iron oxide black.

As a preference, the lignin enhanced wood-plastic material further includes a heat stabilizer, an impact modifier and a plasticizer.

The heat stabilizer is any one of or a combination of more of tribasic lead sulfate, dibasic lead sulfite, zinc stearate, cadmium stearate, lead stearate, calcium stearate, organotins, environment-friendly calcium zinc and a compound lead salt type stabilizer, wherein the organotin heat stabilizer preferably is dibutyltin dilaurate, dioctyltin dilaurate, dibutyltin maleate or di-n-octyl dibutyltin.

The heat stabilizer preferably is an environment-friendly calcium zinc stabilizer and a compound lead salt type stabilizer.

The plasticizer is any one of or a combination of more of dioctyl phthalate, dioctyl terephthalate, phosphate, epoxide, chlorinated paraffin and petroleum ester,
wherein the phosphate is triethyl phosphate and tributyl phosphate, and the petroleum ester is alkyl benzene sulfonate; and
the plasticizer preferably is dioctyl phthalate, chlorinated paraffin and phosphate.

The impact modifier is any one of or a combination of more of a predetermined elastomer type impact modifier, a non-predetermined elastomer type impact modifier, a transitional impact modifier and a rubber type impact modifier, wherein the predetermined elastomer type impact modifier is a methyl methacrylate-butadiene-styrene copolymer MBS, an acrylate type modifier ACR, a high-elasticity acrylonitrile-butadiene-styrene copolymer ABS and a high-elasticity acrylate type modifier ACR;
the non-predetermined elastomer type impact modifier is chlorinated polyethylene CPE and an ethylene-vinyl acetate copolymer EVA.
the transitional impact modifier is a styrene-butadiene-styrene block copolymer SBS and an acrylonitrile-butadiene-styrene copolymer ABS; and
the rubber type impact modifier is ethylene propylene rubber, ethylene-propylene-diene monomer and butyronitrile ethylene propylene rubber.

The impact modifier preferably is chlorinated polyethylene, a high-elasticity acrylate type modifier and an acrylonitrile-butadiene-styrene copolymer.

A preparation method of the lignin enhanced wood-plastic material is characterized by comprising the following steps:
(1) putting lignocellulose, lignin, recycled thermoplastic plastic, a compatilizer and inorganic mineral powder into a mixer according to proprotions, performing high-speed mixing first until a temperature reaches 110-130 DEG C., and then performing cold mixing for 5-15 minutes at a temperature of 70-90 DEG C. to obtain a primary mixed material;
(2) adding the primary mixed material into a first-stage screw of a double-screw extruder, and performing dynamic extrusion mixing at a temperature of 150-190 DEG C. and a revolution speed of 300-400 rpm to obtain a blended material; and
(3) when the material in the first-stage screw enters a second-stage screw of the double-screw extruder, adding a lubricant and a coloring agent to perform secondary treatment and extrusion granulation at a temperature of 150-190 DEG C. and a revolution speed of 300-400 rpm to obtain the lignin enhanced wood-plastic material.

The lignin enhanced wood-plastic material prepared by the preparation method of the lignin enhanced wood-plastic material.

An application of the lignin enhanced wood-plastic material.

Beneficial Effects:

Compared with the prior art, the present invention has the following advantages:

Different lignins are added into the wood-plastic material, and because the lignins contain a large amount of ultraviolet absorption groups, such as an aromatic base, conjugated double bonds, etc., the mechanical properties, the aging resistance and the ultraviolet aging resistance of the wood-plastic composite can be improved, various indexes are far higher than those in a national standard, and the degradation period of the wood-plastic composite is controlled through certain proportioning. The compatibility of the lignocellulose and lignin with thermoplastic plastics is improved by adopting two-stage in-situ modification granulation.

DETAILED DESCRIPTION OF THE INVENTION

The present invention may be better understood according to the following embodiments. However, those skilled in the art easily understand that the contents described by the embodiments are merely used for illustrating the present invention and should not and will not limit the present invention described in detail in the claims.

Embodiment 1

Raw materials: 50 parts of dried bamboo powder (80 meshes), 5 parts of enzymatic hydrolysis lignin, 50 parts of recycled polyethylene, 20 parts of nano calcium carbonate, 5 parts of calcium stearate, 10 parts of maleic anhydride polyethylene, 3 parts of dioctyl phthalate and 4 parts of an acrylic modifier ACR-401.

A manufacturing method includes the following steps:
(1) putting the lignocellulose, the lignin, the recycled thermoplastic plastic, the compatilizer and the inorganic mineral powder into a mixer according to proportions, performing high-speed mixing first until a temperature reaches 110-130 DEG C., and then performing cold mixing for 5-15 minutes at a temperature of 70-90 DEG. C to obtain a primary mixed material; adding the primary mixed material into a first-stage screw of a double-screw extruder, and performing dynamic extrusion mixing under first-stage screw extrusion conditions that the temperature is 150-190 DEG C. and the revolution speed is 300-400 rpm to obtain a blended material; and
(2) when the material in the first-stage screw enters a second-stage screw of the double-screw extruder, adding other related auxiliary agents to perform secondary treatment and extrusion granulation under second-stage screw extrusion conditions that the temperature is 150-190 DEG C. and the revolution speed is 300-400 rpm to obtain the lignin enhanced wood-plastic material.

Embodiment 2

Raw materials: 40 parts of wood flour (80 meshes), 4 parts of papermaking lignin, 50 parts of recycled polypropylene, 10 parts of calcium sulfate, 4 parts of a compound lead stabilizer, 1 part of stearic acid, 1.2 parts of polyethylene wax, 2 parts of dioctyl terephthalate, 4 parts of ACR-401 and 2 parts of maleic anhydride grafted polypropylene. A preparation process is the same as that in the embodiment 1.

Embodiment 3

Raw materials: 50 parts of straw powder (80 meshes), 5 parts of alkali lignin, 60 parts of recycled polyvinyl chloride, 10 parts of carbon black, 3 parts of tribasic lead sulfate, 2 parts of dibasic lead sulfite, 1 part of zinc stearate, 1 part of polyethylene wax, 2 parts of dioctyl phthalate, 4 parts of MBS and 2 parts of γ-aminopropyl triethoxy silane KH-550. A preparation process is the same as that in the embodiment 1.

Embodiment 4

Raw materials: 40 parts of cotton stalk (80 meshes), 6 parts of alkali lignin, 30 parts of recycled polystyrene PS, 30 parts of recycled PVC, 10 parts of metal oxide, 30 parts of an environment-friendly calcium zinc stabilizer, 0.9 part of calcium stearate, 0.8 part of zinc stearate, 4 parts of triethyl phosphate and 3 parts of a styrene-butadiene-styrene block copolymer SBS. A preparation process is the same as that in the embodiment 1.

Embodiment 5

Raw materials: 40 parts of furfural residues, 4 parts of organic solvent lignin, 55 parts of a recycled ABS (acrylonitrile-butadiene-styrene copolymer), 10 parts of metal powder, 1 part of calcium stearate, 0.9 part of polyol ester, 3 parts of epoxide, 4.5 parts of isocyanate and 3 parts of an ethylene-vinyl acetate copolymer. A preparation process is the same as that in the embodiment 1.

Embodiment 6

Raw materials: 50 parts of wood processing leftovers, 7 parts of calcium lignosulfonate, 20 parts of recycled polyamide (PA), 40 parts of chlorinated polyethylene and PVC, 5 parts of an environment-friendly calcium zinc stabilizer, 1 part of oleamide, 4 parts of chlorinated paraffin, 4 parts of N-((3-aminoethyl)-γ-aminopropyl trimethoxy(triethoxy) silane KH-792 and 3 parts of an ethylene-vinyl acetate copolymer EVA. A preparation process is the same as that in the embodiment 1.

Embodiment 7

Raw materials: 50 parts of xylose residues, 5 parts of alkali lignin, 40 parts of recycled polyvinyl chloride, 4 parts of a compound lead salt stabilizer, 10 parts of fiber, 2 parts of microcrystalline wax, 4 parts of petroleum ester, 3 parts of an aluminate coupling agent and 4 parts of ACR. A preparation process is the same as that in the embodiment 1.

Comparative Embodiment

Raw materials: 50 parts of bamboo powder, 60 parts of polyethylene, 20 parts of nano calcium carbonate, 2 parts of stearic acid, 3 parts of polyethylene wax, 5 parts of maleic anhydride grafted polyethylene, 8 parts of chlorinated polyethylene and 3 parts of an acrylic modifier, wherein lignin is not added. A preparation process is the same as that in the embodiment 1.

It can be seen from Table 1 that the wood-plastic material with added lignin in the embodiments 1-7 has better strength, hardness and aging resistance, and the wood-plastic material without lignin has poorer various properties than those of the material with the lignin.

The surface of a sectional material product prepared from the above composite is polished, and the flexural strength, dimensional stability, plate surface nail-holding power and other properties of the product are tested according to a national standard GB/T 24137-2009 "Wood-Plastic Composite Decorative Boards", with test results shown in Table 1.

TABLE 1

| Test items | National standard | Embodiment 1 | Embodiment 2 | Embodiment 3 | Embodiment 4 |
|---|---|---|---|---|---|
| Property test of the lignin enhanced wood-plastic material | | | | | |
| High flexural strength/MPa | ≤20.0 | 72 | 74 | 75 | 77 |
| High tensile strength/MPa | / | 37 | 38 | 38 | 39 |
| High non-notched impact strength/KJ/$m^2$ | / | 19.6 | 16.7 | 20.3 | 21.2 |
| Low dimensional stability/% 0.3 | ≥1.5 | 0.42 | 0.37 | 0.38 | 0.41 |
| Great plate surface nail-holding power/N | ≤800 | 1289 | 1287 | 1379 | 1413 |
| High Shore hardness (HD) 80 | ≤55 | 76 | 72 | 75 | 77 |
| Small thickness swelling rate of water absorption/% 0.2 | ≥0.5 | 0.24 | 0.31 | 0.28 | 0.25 |
| High artificial weathering aging resistance | Flexural strength retention rate/% ≤80 | 92 | 93 | 94 | 98 |
| | Color fastness to light (gray scale)/level ≤3 | 6 | 5 | 7 | 7 |
| High freeze-thaw resistance | Flexural strength retention rate/% ≤80 | 93 | 93 | 95 | 96 |
| | Surface quality/no crazing and bubbling | No | No | No | No |
| Surface pollution and corrosion resistance | No pollution and no corrosion | No | No | No | No |

| Test items | National standard | Embodiment 5 | Embodiment 6 | Embodiment 7 | Comparative embodiment |
|---|---|---|---|---|---|
| Flexural strength/MPa | ≤20.0 | 78 | 73 | 77 | 45 |
| Tensile strength/MPa | / | 40 | 35 | 44 | 21 |
| Non-notched impact strength/KJ/$m^2$ | / | 22.1 | 17.3 | 24.5 | 11.4 |
| Dimensional stability/% | ≥1.5 | 0.32 | 0.54 | 0.34 | 0.94 |
| Plate surface nail-holding power/N | ≤800 | 1488 | 1303 | 1478 | 997 |
| Shore hardness (HD) | ≤55 | 80 | 67 | 80 | 56 |
| Thickness swelling rate of water absorption/% | ≥0.5 | 0.22 | 0.32 | 0.23 | 0.45 |
| Artificial weathering aging resistance | Flexural strength retention rate/% ≤80 | 97 | 92 | 98 | 82 |
| | Color fastness to light (gray scale)/level ≤3 | 6 | 5 | 6 | 4 |
| Freeze-thaw resistance | Flexural strength retention rate/% ≤80 | 95 | 93 | 96 | 85 |

TABLE 1-continued

| | Property test of the lignin enhanced wood-plastic material | | | | |
|---|---|---|---|---|---|
| | Surface quality/no crazing and bubbling | No | No | No | No |
| Surface pollution and corrosion resistance | No pollution and no corrosion | No | No | No | No |

The experimental result shows that the mechanical properties of a lignin enhanced wood-plastic foamed composite meet requirements of the national standard and are far higher than this, and the anti-aging effect of the composite is also good.

Embodiment 8: Influence of Lignin Types on the Properties of a Wood-Plastic Material The following lignins are used: alkali lignin, lignosulfonate, papermaking lignin, enzymatic hydrolysis lignin and organic solvent lignin. The proportion of the lignin is 5 parts by weight, and the proportions of the other components are as follows: 50 parts of dried xylose residues (80 meshes), 50 parts of recycled polyethylene, 20 parts of nano calcium carbonate, 2 parts of polyethylene wax, 1 part of stearic acid, 10 parts of maleic anhydride polyethylene, 3 parts of dioctyl phthalate and 8 parts of chlorinated polyethylene. A preparation process refers to the embodiment 1.

The enzymatic hydrolysis lignin is industrial enzymatic hydrolysis lignin, which is obtained by virtue of organic solvent extraction on cellulosic ethanol residues; the alkali lignin is obtained by dissolving 2%-3% sodium hydroxide, and then performing acid precipitation; the organic solvent lignin refers to lignin extracted through dimethyl sulfoxide and dioxane; the lignosulfonate refers to calcium lignosulfonate; and the papermaking lignin is lignin obtained by performing evaporating concentration on papermaking black liquid and then performing acid precipitation. The contents of lignin in the above enzymatic hydrolysis lignin, alkali lignin, organic solvent lignin and papermaking lignin are 60-70, and the contents of cellulose are less than 5%.

Monitoring results of the influence of the lignin types on the properties of the wood-plastic material are shown in Table 2. It can be seen from Table 2 that the wood-plastic material with the added organic solvent lignin has obvious advantages in strength and aging resistance.

TABLE 2

Influence of the lignin types on the properties of the wood-plastic material

| Test items | Alkali lignin | Lignosulfonate | Papermaking lignin | Enzymatic hydrolysis lignin | Organic solvent lignin |
|---|---|---|---|---|---|
| Flexural strength/MPa | 77 | 68 | 70 | 72 | 78 |
| Tensile strength/MPa | 39 | 37 | 35 | 32 | 40 |
| Non-notched impact strength/KJ/m$^2$ | 22.3 | 16.6 | 16.2 | 17.1 | 22.4 |
| Dimensional stability/% | 0.33 | 0.45 | 0.40 | 0.46 | 0.32 |
| Plate surface nail-holding power/N | 1477 | 1247 | 1239 | 1265 | 1478 |
| Shore hardness (HD) | 79 | 65 | 70 | 68 | 80 |
| Thickness swelling rate of water absorption/% | 0.26 | 0.33 | 0.31 | 0.39 | 0.25 |
| Artificial weathering aging resistance/ Flexural strength retention rate/% | 95 | 93 | 95 | 95 | 98 |
| Artificial weathering aging resistance/color fastness to light (gray scale)/level | 7 | 5 | 4 | 6 | 7 |
| Freeze-thaw resistance/flexural strength retention rate/% | 96 | 95 | 94 | 95 | 98 |
| Surface pollution and corrosion resistance/ No pollution and no corrosion | No | No | No | No | No |

Embodiment 9: Influence of Use Level of Organic Solvent Lignin on the Properties of a Wood-Plastic Material The use level of the organic solvent lignin is adjusted to be 5 parts, 10 parts and 15 parts by weight, and the use levels of the other components are as follows: 50 parts of dried xylose residues (80 meshes), 50 parts of recycled polyethylene, 20 parts of nano calcium carbonate, 2 parts of polyethylene wax, 1 part of stearic acid, 10 parts of maleic anhydride polyethylene, 3 parts of dioctyl phthalate and 8 parts of chlorinated polyethylene. A preparation process refers to the embodiment 1. Test results are shown in Table 3.

TABLE 3

Influence of the use level of the organic solvent lignin on the properties of the wood-plastic material

| Test items | Organic solvent lignin 5 parts | Organic solvent lignin 10 parts | Organic solvent lignin 15 parts |
|---|---|---|---|
| Flexural strength/MPa | 78 | 77 | 75 |
| Tensile strength/MPa | 40 | 39 | 36 |
| Non-notched impact strength/KJ/m$^2$ | 22 | 21 | 19 |
| Dimensional stability/% | 0.32 | 0.31 | 0.35 |
| Plate surface nail-holding power/N | 1478 | 1359 | 1361 |
| Shore hardness (HD) | 80 | 78 | 76 |
| Thickness swelling rate of water absorption/% | 0.25 | 0.28 | 0.30 |
| Artificial weathering aging resistance/ Flexural strength retention rate/% | 98 | 96 | 94 |
| Artificial weathering aging resistance/color fastness to light (gray scale)/level | 7 | 7 | 6 |
| Freeze-thaw resistance/flexural strength retention rate/% | 98 | 95 | 94 |
| Surface pollution and corrosion resistance/ No pollution and no corrosion | No | No | No |

Embodiment 10: Influence of Lignocellulose Types on the Properties of a Wood-Plastic Material The type of the lignocellulose is adjusted to research the influence of the lignocellulose on the properties of the wood-plastic material, and the types of the lignocellulose are as follows: bamboo powder, wood flour, straw powder, cotton stalks, wood processing leftovers, xylose residues and furfural residues. The content of the lignocellulose is 50 parts by weight, and the other components and the contents thereof are as follows: 5 parts of organic solvent lignin, 50 parts of recycled polyethylene, 20 parts of nano calcium carbonate, 2 parts of polyethylene wax, 1 parts of stearic acid, 10 parts of maleic anhydride polyethylene, 3 parts of dioctyl phthalate and 8 parts of chlorinated polyethylene. A preparation method is the same as that in the embodiment 1. Test results are as follows:

TABLE 4

Influence of the lignocellulose types on the properties of the wood-plastic material.

| Test items | Bamboo powder | Wood flour | Straw powder | Cotton stalks | Wood processing leftovers | Xylose residues | Furfural residues |
|---|---|---|---|---|---|---|---|
| Flexural strength/MPa | 69 | 70 | 67 | 71 | 68 | 78 | 76 |
| Tensile strength/MPa | 30 | 32 | 34 | 34 | 32 | 40 | 37 |
| Non-notched impact strength/KJ/m$^2$ | 20 | 18 | 17 | 18 | 19 | 22 | 23 |
| Dimensional stability/% | 0.38 | 0.40 | 0.32 | 0.37 | 0.41 | 0.32 | 0.33 |
| Plate surface nail-holding power/N | 1289 | 1267 | 1246 | 1237 | 1277 | 1478 | 1369 |
| Shore hardness (HD) | 78 | 70 | 68 | 73 | 72 | 80 | 79 |
| Thickness swelling rate of water absorption/% | 0.34 | 0.37 | 0.40 | 0.35 | 0.33 | 0.25 | 0.33 |
| Artificial weathering aging resistance/ Flexural strength retention rate/% | 96 | 95 | 93 | 94 | 96 | 98 | 96 |
| Artificial weathering aging resistance/color fastness to light (gray scale)/level | 6 | 5 | 5 | 6 | 4 | 7 | 7 |
| Freeze-thaw resistance/flexural strength retention rate/% | 95 | 92 | 90 | 93 | 94 | 98 | 97 |
| Surface pollution and corrosion resistance/ No pollution and | No | No | No | No | No | No | No |

TABLE 4-continued

Influence of the lignocellulose types on the properties of the wood-plastic material.

| Test items | Bamboo powder | Wood flour | Straw powder | Cotton stalks | Wood processing leftovers | Xylose residues | Furfural residues |
|---|---|---|---|---|---|---|---|
| no corrosion | | | | | | | |

Embodiment 11: Influence of Recycled Plastic on the Properties of a Wood-Plastic Material The type of the plastic is adjusted to research the influence of the recycled plastic and an original plastic on the properties of the wood-plastic material. The types of the used plastic are as follows: recycled polyethylene, original polyethylene, recycled polypropylene, original polypropylene, recycled polystyrene and original polystyrene, and the use level of the plastic is 50 parts by weight. The components and contents thereof of other materials are as follows: 50 parts of dried xylose residues (80 meshes), 5 parts of organic solvent lignin, 20 parts of nano calcium carbonate, 2 parts of polyethylene wax, 1 part of stearic acid, 10 parts of maleic anhydride polyethylene, 3 parts of dioctyl phthalate and 8 parts of chlorinated polyethylene.

Embodiment 12: Influence of First-Stage Screw Granulation and Second-Stage Screw Granulation on the Properties of a Wood-Plastic Material A formula of raw materials is as follows: 50 parts of dried xylose residues (80 meshes), 5 parts of organic solvent lignin, 50 parts of recycled polyethylene, 20 parts of nano calcium carbonate, 2 parts of polyethylene wax, 1 part of stearic acid, 10 parts of maleic anhydride polyethylene, 3 parts of dioctyl phthalate and 8 parts of chlorinated polyethylene. A first-stage screw and a second-stage screw are used for granulation respectively, a preparation method with the second-state screw granulation is the same as that in the embodiment 1, and a preparation method with the first-stage screw granulation includes the following steps:

TABLE 5

Influence of the recycled plastic on the properties of the wood-plastic material

| Test items | Recycled polyethylene | Original polyethylene | Recycled polypropylene | Original polypropylene | Recycled polystyrene | Original polystyrene |
|---|---|---|---|---|---|---|
| Flexural strength/MPa | 78 | 76 | 74 | 73 | 72 | 73 |
| Tensile strength/MPa | 40 | 30 | 35 | 36 | 32 | 33 |
| Non-notched impact strength/KJ/m$^2$ | 22.4 | 21.5 | 18.1 | 18.8 | 18.5 | 18.7 |
| Dimensional stability/% | 0.32 | 0.31 | 0.36 | 0.35 | 0.32 | 0.31 |
| Plate surface nail-holding power/N | 1478 | 1466 | 1430 | 1439 | 1477 | 1480 |
| Shore hardness (HD) | 80 | 78 | 75 | 76 | 70 | 72 |
| Thickness swelling rate of water absorption/% | 0.25 | 0.28 | 0.32 | 0.31 | 0.35 | 0.36 |
| Artificial weathering aging resistance/ Flexural strength retention rate/% | 98 | 96 | 95 | 94 | 95 | 94 |
| Artificial weathering aging resistance/color fastness to light (gray scale)/level | 7 | 7 | 5 | 5 | 6 | 6 |
| Freeze-thaw resistance/flexural strength retention rate/% | 98 | 96 | 94 | 95 | 95 | 94 |
| Surface pollution and corrosion resistance/ No pollution and no corrosion | No | No | No | No | No | No |

(1) putting bamboo powder, enzymatic hydrolysis lignin, the recycled polyethylene, the nano calcium carbonate, the polyethylene wax, the stearic acid, the maleic anhydride polyethylene, the dioctyl phthalate, the chlorinated polyethylene and inorganic mineral powder into a mixer according to weight ratios, performing high-speed mixing first until a temperature reaches 110-130 DEG C., and then performing low-speed mixing at 60 DEG C. to obtain a primary mixed material; and (2) adding the primary mixed material into the first-stage screw for dynamic extrusion mixing under a first-stage screw extrusion condition that the temperature is 150-200 DEG C. to obtain lignin enhanced wood-plastic material.

The property test of the wood-plastic material is as shown in Table 6.

TABLE 6

Influence of the first-stage screw granulation and the second-stage screw granulation on the properties of the wood-plastic material.

| Test items | Second-stage screw granulation | First-stage screw granulation |
|---|---|---|
| Flexural strength/MPa | 78 | 48 |
| Tensile strength/MPa | 40 | 20 |
| Non-notched impact strength/KJ/m$^2$ | 22.4 | 12.1 |
| Dimensional stability/% | 0.32 | 0.56 |
| Plate surface nail-holding power/N | 1478 | 1278 |
| Shore hardness (HD) | 80 | 65 |
| Thickness swelling rate of water absorption/% | 0.25 | 0.38 |
| Artificial weathering aging resistance/ Flexural strength retention rate/% | 98 | 85 |
| Artificial weathering aging resistance/color fastness to light (gray scale)/level | 7 | 4 |
| Freeze-thaw resistance/flexural strength retention rate/% | 98 | 89 |
| Surface pollution and corrosion resistance/ No pollution and no corrosion | No | No |

Comparative embodiment 2: An enzymatic hydrolysis lignin-wood fiber-polyolefin mixed composite is prepared by referring to a method in a patent CN102051002A, and a specific preparation method includes the following steps:
(1) putting 40 parts of high-density polyethylene, 10 parts of enzymatic hydrolysis lignin, 50 parts of wood flour, 4 parts of maleic anhydride grafted polyethylene (MAPE) and 1 part of paraffin into a high-speed mixer in parts by mass, performing high-speed mixing for 10 min under the conditions that the mixing temperature is 100 DEG C. and the mixing revolution speed is 1800 r/min, and pouring the obtained mixture into a storage bin of an extruder after discharging, wherein the used enzymatic hydrolysis lignin also comes from leftovers generated during production of ethanol by taking wheat stalks as a raw material, the content of lignin is more than 65%, total sulfur-0.1%, ash content-0.20%, and cellulose
(2) performing extrusion molding through a parallel double-screw two-stage extruder group and a profile auxiliary machine, wherein the revolution speed of two screws is 100 r/min, the temperature is set to rise first and then fall from a feed zone to a discharge port, and the temperature range is 175-150 DEG C.; the revolution speed of a single screw is 15 r/min, the temperature is set to fall first and then rise from a feed port to the front end of a mold, and the temperature range is 170-180 DEG C.; and the temperature at the outlet of the mold is 170 DEG C., and cooling water is introduced to the tail end of the mold to obtain an enzymatic hydrolysis lignin-wood fiber-polyolefin mixed composite (a sheet having sectional dimensions of 40 mm in width and 4 mm in thickness).

Comparative embodiment 3: An enzymatic hydrolysis lignin-wood fiber-polyolefin mixed composite is prepared by referring to the method in the patent CN102051002A, and a specific preparation method is as follows:

The preparation method of the enzymatic hydrolysis lignin-wood fiber-polyolefin mixed composite includes the following steps:
(1) putting 40 parts of high-density polyethylene, 10 parts of enzymatic hydrolysis lignin, 60 parts of wood flour, 4 parts of maleic anhydride grafted polyethylene (MAPE) and 1 part of paraffin into a high-speed mixer in parts by mass, performing high-speed mixing for 10 min under the conditions that the mixing temperature is 100 DEG C. and the mixing revolution speed is 1800 r/min, and pouring the obtained mixture into a storage bin of an extruder after discharging, wherein the used enzymatic hydrolysis lignin also comes from leftovers generated during production of ethanol by taking wheat stalks as a raw material, the content of lignin is more than 65%, total sulfur-0.1%, ash content-0.20%, and cellulose
(2) performing extrusion molding through a parallel double-screw two-stage extruder group and a profile auxiliary machine, wherein the revolution speed of two screws is 100 r/min, the temperature is set to rise first and then fall from a feed zone to a discharge port, and the temperature range is 175-150 DEG C.; the revolution speed of a single screw is 15 r/min, the temperature is set to fall first and then rise from a feed port to the front end of a mold, and the temperature range is 170-180 DEG C.; and the temperature at the outlet of the mold is 170 DEG C., and cooling water is introduced to the tail end of the mold to obtain the enzymatic hydrolysis lignin-wood fiber-polyolefin mixed composite (a sheet having sectional dimensions of 40 mm in width and 4 mm in thickness).

Embodiment 13

50 parts of dried xylose residues (80 meshes), 5 parts of organic solvent lignin, 50 parts of recycled polyethylene, 20 parts of nano calcium carbonate, 2 parts of polyethylene wax, 1 part of stearic acid, 10 parts of maleic anhydride polyethylene, 3 parts of dioctyl phthalate, and 8 parts of chlorinated polyethylene. A preparation process refers to the embodiment 1.

TABLE 7

Influence on the properties of a wood-plastic material

| Test items | Comparative embodiment 2 | Comparative embodiment 3 | Embodiment 13 |
|---|---|---|---|
| Flexural strength/MPa | 63 | 62 | 78 |
| Tensile strength/MPa | 30 | 33 | 40 |
| Non-notched impact strength/KJ/m$^2$ | 10.2 | 13.5 | 22.4 |
| Dimensional stability/% | 0.53 | 0.62 | 0.32 |
| Plate surface nail-holding power/N | 1210 | 1202 | 1478 |
| Shore hardness (HD) | 58 | 59 | 80 |
| Thickness swelling rate of water absorption/% | 0.44 | 0.40 | 0.25 |
| Artificial weathering aging resistance/ Flexural strength retention rate/% | 82 | 81 | 98 |
| Artificial weathering aging resistance/color fastness to light (gray scale)/level | 4 | 4 | 7 |
| Freeze-thaw resistance/ | 80 | 78 | 98 |

TABLE 7-continued

Influence on the properties of a wood-plastic material

| Test items | Comparative embodiment 2 | Comparative embodiment 3 | Embodiment 13 |
|---|---|---|---|
| flexural strength retention rate/% Surface pollution and corrosion resistance/ No pollution and no corrosion | No | No | No |

What is claimed is:

1. A method for preparing lignin enhanced wood-plastic material, characterized by comprising the following steps:
   (1) putting 20-60 parts of lignocellulose, 20-40 parts of lignin, 20-40 parts of recycled thermoplastic plastic, 2-10 parts of a compatibilizer and 5-10 parts of inorganic mineral powder by weight into a mixer, performing high-speed mixing first until a temperature reaches 110-130° C., and then performing cold mixing for 5-15 minutes at a revolution speed of 200-300 rpm and a temperature of 70-90° C. to obtain a primary mixed material;
   (2) adding the primary mixed material into a first-stage screw of a double-screw extruder, and performing dynamic extrusion mixing at a temperature of 150-190° C. and a revolution speed of 300-400 rpm to obtain a blended material; and
   (3) when the material in the first-stage screw enters a second-stage screw of the double-screw extruder, adding 1-5 parts of a lubricant and 1-5 parts of a coloring agent by weight to perform secondary treatment and extrusion granulation at a temperature of 150-190° C. and a revolution speed of 300-400 rpm to obtain the lignin enhanced wood-plastic material.

2. The method according to claim 1, characterized in that the lignocellulose is any one of or a combination of more of wood flour, bamboo powder, straw powder, cotton stalks, wood processing leftovers, xylose residues and furfural residues.

3. The method according to claim 1, characterized in that the lignin is any one of or a combination of more of papermaking lignin, enzymatic hydrolysis lignin, alkali lignin, organic solvent lignin and lignosulfonate.

4. The method according to claim 1, characterized in that the recycled thermoplastic plastic is any one of or a combination of more of recycled PP, recycled PE, recycled PVC, recycled PS, recycled acrylonitrile-butadiene-styrene copolymer and recycled polyamide.

5. The method according to claim 1, characterized in that the compatibilizer is one of or a mixture of more of maleic anhydride, acrylic acid, maleic anhydride grafted PP, maleic anhydride grafted PE, maleic anhydride grafted PVC, maleic anhydride grafted PS, acrylic acid grafted PP, acrylic acid grafted PE, acrylic acid grafted PVC, acrylic acid grafted PS, a silane coupling agent, a titanate coupling agent and isocyanate.

6. The method according to claim 1, characterized in that the inorganic mineral powder is one of or a mixture of more of calcium carbonate, calcium silicate, talcum powder, glass fiber powder, barium sulfate, calcium sulfate, lithopone, carbon black, metal oxide, metal powder and fiber mineral powder.

7. The method according to claim 1, characterized in that the lubricant is one of or a mixture of more of stearic acid, calcium stearate, zinc stearate, polyol ester, oleamide, microcrystalline wax, EBS, liquid paraffin and polyethylene wax.

8. The method according to claim 1, characterized in that the coloring agent is one of or a mixture of more of iron oxide red, iron oxide yellow, iron oxide blue, iron oxide purple and iron oxide black.

* * * * *

UNITED STATES PATENT AND TRADEMARK OFFICE
CERTIFICATE OF CORRECTION

PATENT NO. : 10,400,106 B2
APPLICATION NO. : 15/801210
DATED : September 3, 2019
INVENTOR(S) : Hanjie Ying et al.

Page 1 of 1

It is certified that error appears in the above-identified patent and that said Letters Patent is hereby corrected as shown below:

On the Title Page

(72) Inventors should read: Hanjie Ying (Nanjing, CN); Lingxia Zhong (Nanjing, CN); Chenjie Zhu (Nanjing, CN); Chenglun Tang (Nanjing, CN); Xiao Zhang (Nanjing, CN); Yong Chen (Nanjing, CN); Jinglan Wu (Nanjing, CN); Tao Gan (Nanjing, CN); Junqiang Shan (Nanjing, CN); Dong Liu (Nanjing, CN)

Signed and Sealed this
Eighth Day of October, 2019

Andrei Iancu
*Director of the United States Patent and Trademark Office*